Nov. 23, 1971   C. W. HUNTER   3,621,797

LOCATING DEVICE FOR PALLET

Filed Nov. 12, 1969

United States Patent Office 3,621,797
Patented Nov. 23, 1971

3,621,797
LOCATING DEVICE FOR PALLET
Calvin W. Hunter, Battle Creek, Mich., assignor to
Clark Equipment Company
Filed Nov. 12, 1969, Ser. No. 875,618
Int. Cl. B65d *19/18*
U.S. Cl. 108—51                                      1 Claim

ABSTRACT OF THE DISCLOSURE

Locating devices are secured to the corner of a rectangular central panel to form a captive pallet. The devices have an outer angled surface that mates with an angled surface on automatic material handling transport devices. The locating devices also have an inner surface that positions and retains a material unit upon the captive pallet.

BACKGROUND OF THE INVENTION

This invention relates to locating devices for load-carrying pallets, particularly those used in automatic material handling systems.

In some automatic material handling systems it is desirable to use captive or slave pallets that are all of the same size and configuration to facilitate automatic handling by the system of many material units. Double-faced pallets adapted for handling by industrial lift trucks may be placed directly upon the captive load-carrying pallets thereby eliminating the necessity to manually restack the material unit to be stored. In the process of placing the material unit upon the load-carrying pallet, positioning of the material unit to avoid overhang should be easily accomplished. It is also desirable for safety, speed, and efficiency, that the pallet be accurately and easily positioned relative to the material unit storage bins and to the many automatic transport devices handling the pallet as it moves through the system.

SUMMARY OF THE INVENTION

One preferred form of the invention comprises a plurality of locating devices affixed to a load-carrying pallet. Each locating device provides a pallet referencing surface and a material unit positioning surface. The pallet referencing surface is engaged by a mating surface on the transport devices and storage bins of an automatic material handling system for proper location of the pallet within the system. The material unit positioning surface makes it easier to place a material unit upon the load-carrying pallet so that it does not overhang the pallet and also retains the material unit within the boundaries of the pallet during transportation and storage. The locating devices also provide protection to the central panel from damage due to impact and provide pallet referencing and material unit positioning surfaces which will not easily wear or deform during service.

The objects and advantages of this invention will be apparent from the following detailed description.

DESCRIPTION OF PREFERRED EMBODIMENT

Figure 1:
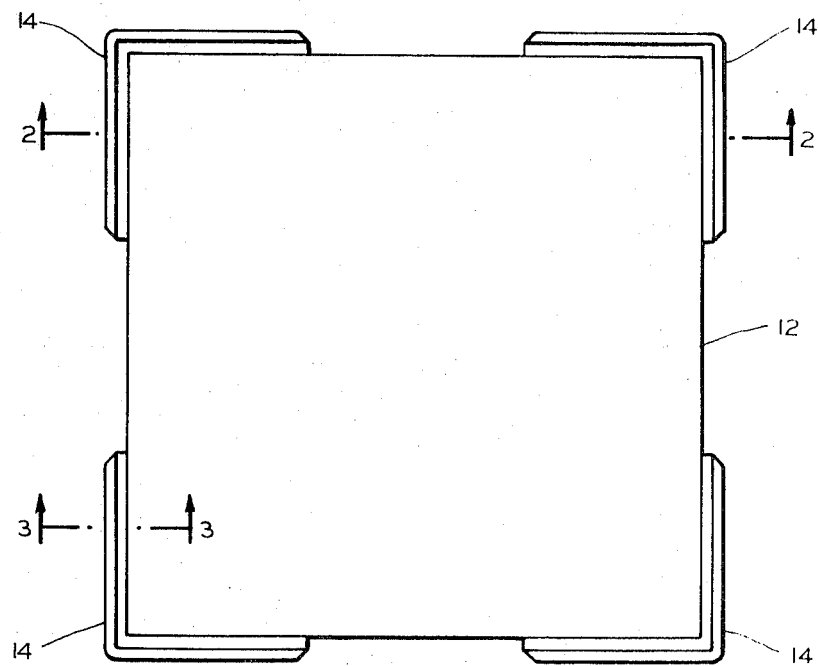
FIG. 1 is a drawing of an embodiment of this invention showing a captive or load-carrying pallet having locating devices thereon.

Referring to FIG. 1, a load-carrying pallet has a central panel 12 and locating devices 14. In this embodiment central panel 12 is generally rectangular and a locating device is affixed at each corner, but the central panel may be of any appropriate shape and devices may be affixed at different locations for a particular type of pallet and material handling system.

Figure 3:
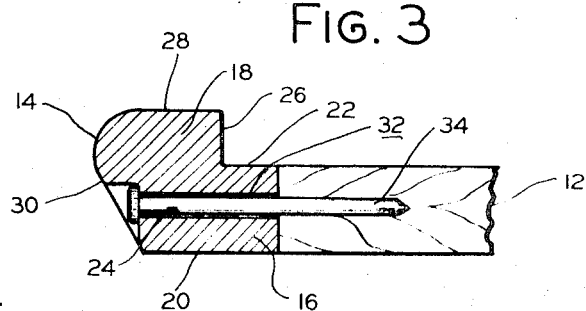
FIG. 3 is a sectional view of a locating device along the line 3—3 of FIG. 1 having a means for affixing.

Each of the devices 14 comprises a normally horizontal portion 16 and a normally upright portion 18 as best shown in FIG. 3. Horizontal portion 16 has surfaces 20 and 22 thereon and transverse countersunk openings 24 therethrough. Upright portion 18 has a material unit positioning surface 26, a terminal surface 28, and a pallet referencing surfacing 30 common to both upright portion 18 and horizontal portion 16.

Locating devices 14 are affixed to central panel 12 by means for affixing of any known type such as an attaching means 32 that comprises a plurality of fasteners 34 longitudinally disposed through openings 24 into tensile engagement with central panel 12.

Figure 4:
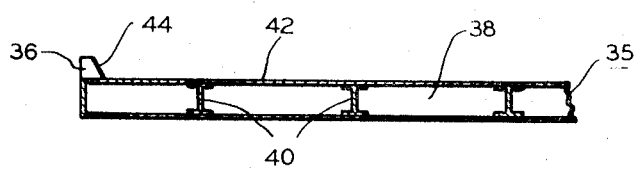
FIG. 4 is a simplified side view of a portion of one of the automatic material handling system transport devices with an indexing surface according to this invention.

Referring to FIG. 4, the pallet transport devices 35 of an automatic material handling system have a pallet indexing portion 36. Transport devices 35 include side members 38 and transverse members 40 which cooperate to form pallet support surface 42. Indexing portion 36 protrudes above pallet support surface 42 and has a pallet indexing surface 44.

To enter a material unit into an automatic material handling system the material unit is placed upon the load-carrying pallet and blocked against material unit positioning surfaces 26 on some of locating devices 14. If the material unit is not positioned correctly within the boundaries of the pallet, upwardly extending portions 18 of locating devices 14 will not allow the material unit to set fully upon central panel 12 and repositioning will be required. Once the material unit is correctly positioned upon the pallet, material unit positioning surfaces 26 will retain the material unit in the proper position by engaging the sides of the material unit to resist shifting forces.

When the load-carrying pallet is to be received by one of transport devices 35 of the automatic material handling system, pallet support surface 42 of the particular transport device 35 is brought into sliding engagement with the lower surface of the load-carrying pallet. Transport device 35 is then slidably withdrawn in a lateral direction from beneath the pallet until pallet indexing surface 44 engages pallet referencing surface 30. Upon engagement of these two surfaces the pallet is properly indexed into a preselected position upon the transport device and automatic handling of the load-carrying pallet may commence.

As the load-carrying pallet moves through the system it is transferred from one transport device to another, such as transfer carts, stacker retrievers, and lateral shuttles. During transfer it is desirable that the pallet be accurately indexed into a preselected position upon each transport device so that error in the placement of the pallet will not accumulate. To accomplish this purpose some, or all, of the transport devices within the system may have a pallet indexing surface 44 that engages pallet referencing surface 30 to accurately position the pallet upon the particular transport device.

Some or all of the storage bins, or material unit storage compartments, within the automatic system may also have pallet indexing surface 44. When the material unit is deposited for storage within a preselected storage bin by transport device 35, pallet referencing surface 30 is brought into engagement with pallet indexing surface 44 to accurately position the load-carrying pallet within the storage bin.

Figure 2:
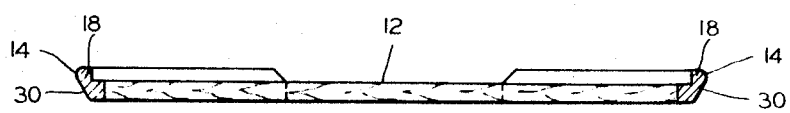
FIG. 2 is a sectional view of the captive or load-carrying pallet along line 2—2 of FIG. 1.

Locating devices 14 are formed of a relatively strong material, such as metallic castings, that will not easily chip, break, or deform. As shown in FIG. 2, locating devices 14 extend beyond the periphery of central panel 12 and thereby protect central panel 12 from damage due to impact. Pallet referencing surface 30 and material unit positioning surface 26 are not easily deformed or worn during service, thereby providing an extended useful life for a particular load-carrying pallet.

This specification contains a written description of the invention and the manner and process of making and using it and set forth the best mode contemplated of carrying out the invention, however, there may be variations, combinations, alterations and modifications of the invention that can be made within the spirit of the invention.

I claim:
1. Apparatus for handling material units comprising:
a load-carrying pallet having a rectangular central panel with a load supporting surface and a locating device attached to a corner of said central panel, said locating device having an interface surface mating with a corner of said panel, a pallet referencing surface extending above and generally upward and outward from said panel at an obtuse angle, and a material unit positioning surface disposed inwardly toward said panel in relation to said referencing surface and extending above and generally normal to said load supporting surface, and a transport device for receiving and transporting said pallet including a pallet indexing surface on said transport device adapted to contact said pallet referencing surface on said locating device when said transport device is receiving said pallet to urge said pallet toward a selected location on said transport device.

References Cited
UNITED STATES PATENTS

| | | | |
|---|---|---|---|
| 1,010,801 | 12/1911 | Rapp | 108—53 X |
| 1,638,563 | 8/1927 | Carruth et al. | 206—60 X |
| 1,952,749 | 3/1934 | Ellis | 108—27 |
| 2,137,142 | 11/1938 | Nelson, Jr. et al. | 206—60 A |
| 2,818,180 | 12/1957 | Keene | 211—50 |
| 2,828,007 | 3/1958 | Foss | 206—46 |
| 2,685,147 | 8/1954 | Burr | 248—345.1 |

BOBBY R. GAY, Primary Examiner

G. O. FINCH, Assistant Examiner

U.S. Cl. X.R.

108—54